3,553,257
PREPARATION OF d-2-AMINO-1-BUTANOL SALTS
Imre Aurel Halmos, Summit, and Thomas Emory Ricketts, Plainfield, N.J., assignors to American Cyanamid Company, Stamford, Conn., a corporation of Maine
No Drawing. Filed Sept. 16, 1966, Ser. No. 579,842
Int. Cl. C07c 91/04
U.S. Cl. 260—501.17
7 Claims

ABSTRACT OF THE DISCLOSURE

A racemic mixture of dl-2-amino-1-butanol is resolved with separation of the d-2-amino-1-butanol by crystallizing as a salt with L(+)-tartaric acid from an essentially anhydrous solution in ethanol or methanol. The salt is decomposed with calcium hydroxide to yield the d-2-amino-1-butanol. Water may be added to the residual anhydrous solution to separate the l-2-amino-1-butanol. Other listed volatile solvents may be present in the anhydrous ethanol or methanol without inhibiting the sharp separation.

---

This invention relates to a process for isolating (or separating) d-2-amino-1-butanol from a mixture of d-2-amino butanol and l-2-amino butanol by resolving the optical isomers using L-tartaric acid.

2-amino-1-butanol is used as an intermediate in the synthesis of certain compounds having therapeutic activity as described in U.S. Pat. 3,176,040, Mar. 30, 1965, Wilkinson and Shephard, Novel 2,2′-Ethylenediimino)-Di-1-Butanols. For this synthesis, the d- form is preferred. Wilkinson, R. G. et al., J. Am. Chem. Soc 83, 2212–13 (1961).

The formula for 2-amino-1-butanol is:

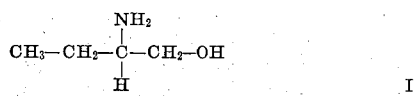

As the second carbon atom is asymmetric, there are two optically active isomers: (1) the dextro-form (d- or (+) -form), which rotates the plane of polarized light to the right, and (2) the levo-form (l- or (−) -form), which rotates the plane of polarized light to the left. The two forms are present in equal amounts in the racemic or unresolved mixture, i.e., dl-form, of 2-amino-1-butanol, which is the form of the commercial product.

Optically active isomers cannot be separated by simple conventional procedures, such as ordinary crystallization. The most frequently used method for the separation of optically active isomers is chemical resolution. In the case of bases, an optically active acid is added and the two resulting salts are separated by fractional crystallization. Repeated crystallizations are generally required to completely separate the two salts. After the salts are separated, the optically active free bases are recovered by adding a strong alkali to each.

Some optical isomers are distinguished by absolute prefixes D- and L-. These symbols are used where the molecular configuration is known, often through synthesis from another molecule of established configuration. The optical rotation is then sometimes indicated by an additional symbol, usually (+) or (−).

Such a process requires an optically active material to be used in the resolution. Tartaric acid is commercially available as a by-product of the wine industry in the L(+) tartaric acid form. This material actaually has the L configuration but is dextro-rotatory and, therefore, indicated as (+). Other optically active acids such as glutamic acid have also been used commercially for resolution.

In one procedure [Compt. Rend. 253, 2704 (1961)], L(+)-tartaric acid is added to an ethyl alcohol solution of dl-2-amino-1-butanol, and the acid salt of l-2-amino-1-butanol with the L-tartaric acid is crystallized from the solution. Presumably the alcohol was not anhydrous but contained water, probably about 5%. A low yield of impure salt of d-2-amino-1-butanol is recovered from the mother liquor.

In another procedure [J. Am. Chem. Soc. 76, 2801, 4382 (1954)], L-tartaric acid was treated in an aqueous solution with dl-2-amino-1-butanol, and the acid salt of l,2-amino-1-butanol with L-tartaric acid is crystallized from the solution. A low yield of impure salt of d-2-amino-1-butanol is recoverable from the mother liquor.

We have now found that superior resolution is obtained by dissolving dl-2-amino-1-butanol in a suitable essentially anhydrous organic solvent, then adding L(+)-tartaric acid. The acid L-tartrate of d-2-amino-1-butanol crystallizes from solution, leaving the l-2-amino-1-butanol in solution. The d-2-amino-1-butanol is then recovered by (1) dissolving or suspending the acid L-tartrate of d-2-amino-1-butanol in water or water-organic solvent mixture, (2) adding a strong alkaline earth alkali, (3) separating the inorganic tartrate salt by filtration, and (4) fractionally distilling the filtrate. An excellent yield of d-2-amino-1-butanol of high purity is thus obtained.

The solvent is the key to the process. The preferred solvent is methanol or ethanol, or a mixture. Also, combinations of either or both with other volatile solvents are useful. The other solvents can be lower alcohols such as isopropyl, n-propanol, n-butanol, secondary butanol, etc., lower ether-alcohols such as methoxyethanol, ethoxyethanol, etc., lower ethers such as ethyl ether, isopropyl ether, butyl ether, 1,2-dimethoxyethane, 1,2-diethoxyethane, bis(methoxyethyl) ether, bis(ethoxyethyl) ether, etc., and lower ketones such as acetone, methyl ethyl ketone, etc. In the combinations at least 50% of methanol or ethanol should be present.

Although for optimum results the solvents should be anhydrous, up to about 1% of water based on the weight of the solvents can be tolerated.

The amount of L-tartaric acid used depends on which of two procedures are employed. In the first procedure, between 0.75 and 1.0 mole of L-tartaric acid is used per mole of 2-amino-1-butanol. In the second procedure, about 0.5 mole of L-tartaric acid and about 0.5 mole of another acid which forms a salt soluble in the solvent system, such as formic, acetic, propionic, hydrochloric or hydrobromic acids, are used per mole of dl-2-amino-1-butanol.

The L-tartaric acid and dl-2-amino-1-butanol are dissolved in the solvent at an elevated temperature, usually at or near the reflux temperature. Sufficient solvent is used to effect solution. The solution is then cooled and the crystallized acid L-tartrate of d-2-amino-1-butanol is separated by filtering, centrifuging or a similar procedure. The salt is washed with a small amount of solvent, and if desired, may be purified by recrystallization. The excess of solvent may be removed from the crystals by drying, but for many uses this is unnecessary.

The d-2-amino-1-butanol is recovered from the tartaric acid salt by adding an alkaline earth oxide or hydroxide to a suspension or solution of the salt in water, or mixture of water and water-miscible organic solvent, thereby freeing the d-2-amino-1-butanol as the organic base.

Suitable alkaline earth oxides include barium oxide, calcium oxide and strontium oxide; suitable alkaline earth hydroxides include barium hydroxide, calcium hydroxide and strontium hydroxide.

Suitable water-miscible solvents include lower aliphatic alcohols, such as methanol and ethanol, and amides such as dimethylformamide and formamide.

Sufficient alkaline earth oxide and hydroxide is used to liberate all of the organic base from the L-tartrate; in other words, at least a stoichiometric amount of inorganic basic material is used.

The alkaline earth L-tartrate is filtered from the solution of $d$-2-amino-1-butanol, and the latter is recovered by fractionally distilling the filtrate.

The L-tartrate salt of $l$-2-amino-1-butanol remaining in the mother liquors after separation of the L-tartrate salt of $d$-2-amino-1-butanol can be recovered. When 1.0 mole of L-tartaric acid per mole of $dl$-2-amino-1-butanol has been used, it is only necessary to add water and the salt crystallizes out as the monohydrate. When less than 1.0 mole of L-tartaric acid has been used, sufficient tartaric acid is added to make a total of 1.0 mole per mole of $dl$-2-amino-1-butanol. Water is then added. The $l$-2-amino-1-butanol is then liberated from the L-tartrate as described above for the $d$-2-amino-1-butanol.

The L-tartrate acid may be recovered from either or both components, and reused, thus conserving the optically active acid.

As illustrative of this invention, certain examples here follow. Parts and percentages are by weight in the following examples and claims.

EXAMPLE 1

To a stirred solution of 55 parts (0.62 mole) of racemic 2-amino-1-butanol in 400 parts of methanol (0.03–0.04% water) there is slowly added 95 parts (0.63 mole) of L-tartaric acid while keeping the temperature of the solution at 35–40° C. When all of the L-tartaric acid has dissolved, the solution is seeded with a trace amount of acid L-tartrate of $d$-2-amino-1-butanol at 30–35° C. The mixture is cooled over three hours to a temperature of 5° C. The crystalline precipitate of the acid L-tartrate of $d$-2-amino-1-butanol is separated by filtration, washed with 45–50 parts of cold methanol and dried. About 60 parts, 81.5% of theory, of product is obtained.

EXAMPLE 2

The procedure of Example 1 is repeated substituting 47.5 parts (0.315 mole) of L-tartaric acid and 18.9 parts (0.315 mole) of glacial acetic acid for the 95 parts of L-tartaric acid. About 60 parts of acid L-tartrate of $d$-2-amino-1-butanol is obtained.

EXAMPLE 3

To a stirred solution of 55 parts (0.62 mole) of racemic 2-amino-1-butanol in a mixture of 280 parts of dry methanol and 120 parts of dry isopropanol, there is slowly added 75 parts (0.5 mole) of L-tartaric acid while keeping the temperature at 35–40° C. When all of the L-tartaric acid has dissolved, a trace amount of crystalline acid L-tartrate of $d$-2-amino-1-butanol is added as seed, and the mixture is cooled to 0–5° C. over two hours. The crystalline precipitate of the acid L-tartrate of $d$-2-amino-1-butanol is separated by filtration, washed with a minimum amount of a mixture of 2 parts of methanol and 1 part of isopropanol and dried. About 64 parts, 88% of theory, of product is obtained.

EXAMPLE 4

The procedure of Example 3 is repeated using 160 parts of dry methanol and 160 parts of dry acetone as the solvent. About 59 parts of the acid L-tartrate of $d$-2-amino-1-butanol is obtained.

In a similar manner, mixtures of dry methanol and each of methoxyethanol, ethoxyethanol, 1,2-dimethoxyethane, 1,2-diethoxyethane, bis(methoxyethyl) ether, bis(ethoxyethyl) ether and methyl ethyl ketone are employed. Similar results are obtained.

EXAMPLE 5

To a stirred solution of 55 parts (0.62 mole) of racemic 2-amino-1-butanol in 550 parts of anhydrous ethanol there is slowly added 75 parts (0.5 mole) of L-tartaric acid while keeping the temperature below 60° C. The mixture is then stirred at 60–65° C. until all of the L-tartaric acid has dissolved. After "seeding" with a trace amount of acid L-tartrate of $d$-2-amino-1-butanol, the mixture is cooled to about 20° C. The crystalline precipitate of the acid L-tartrate of $d$-2-amino-1-butanol is separated by filtration, washed with anhydrous ethanol and dried. About 65 parts, 98% or theory, of product is obtained.

EXAMPLE 6

To a stirred solution of 89 parts (1.0 mole) of technical racemic 2-amino-1-butanol (92% real) in 280 parts of dry methanol there is slowly added 150 parts (1.0 mole) of L-tartaric acid while keeping the temperature at 40–45° C. After seeding the resulting solution with a trace amount of acid L-tartrate of $d$-2-amino-1-butanol and cooling to 0–5° C., over three hours, a crystalline precipitate of the acid L-tartrate of $d$-2-amino-1-butanol is formed, which is separated by filtration, washed with 120 parts of cold methanol and dried. About 107 parts, 89.2% of theory, of product is obtained.

EXAMPLE 7

The acid L-tartrate of $d$-2-amino-1-butanol, the product of Example 6, is dissolved in a minimum amount of water. Sufficient calcium hydroxide is added to precipitate all of the tartaric acid as calcium tartrate. The calcium tartrate is separated by filtration, and the $d$-2-amino-1-butanol is recovered as the free base by distilling the filtrate to separate the water, leaving the free base behind. A column is used to prevent the $d$-2-amino-1-butanol from distilling over in part with the water.

EXAMPLE 8

To the combined mother liquor and wash liquor from Example 6 there is added 55 parts of water at 35–40° C. The solution is "seeded" with a trace amount of acid L-tartrate monohydrate of $l$-2-amino-1-butanol. After cooling to 5° C. over 2.5 hours, the crystalline product is separated by filtration, washed with a cold mixture of 80 parts of methanol and 20 parts of water and dried. About 98 parts, 76% of theory, of the acid L-tartrate monohydrate of $l$-2-amino-1-butanol is obtained.

Following the procedure of Example 7, the $l$-2-amino-1-butanol is separated.

EXAMPLE 9

The combined tartaric acid salts from Examples 7 and 8 are mixed, acidified with a stoichiometric quantity of sulfuric acid, and sufficient water to dissolve all of the tartaric acid is added, the calcium sulfate is separated, and free L-tartaric acid recovered from the aqueous layer remaining, by evaporating off water.

The L-tartaric acid is reused for a subsequent run.

In laboratory and small scale operations, after separation of the $d$-2-amino-1-butanol, as in Example 7, using the process of Example 2 for preparation of the tartaric acid salt, all residues of solvents, residual tartrates and $l$-2-amino-1-butanol can be combined and burned or dumped to sewage. In large scale operations, solvent recovery and L-tartaric acid recovery are economically justified.

We claim:

1. The process of preparing the acid L-tartrate of $d$-2-amino-1-butanol comprising forming a solution of $dl$-2-amino-1-butanol in a solvent consisting essentially of an anhydrous lower alkanol selected from the group consisting of methanol and ethanol and not more than 1.0% water, adding thereto L-tartaric acid in at least about a one-half molar quantity, and separating the crystalline acid L-tartrate of $d$-2-amino-1-butanol.

2. The process of claim 1 in which the solvent is essentially anhydrous methanol.

3. The process of claim 1 in which the solvent is essentially anhydrous ethanol.

4. The process of claim 1 in which the solvent is essentially an anhydrous mixture of ethanol and methanol.

5. A process for separating d-2-amino-1-butanol from dl-2-amino-1-butanol comprising following the process of claim 1, then suspending the acid L-tartrate salt of d-2-amino-1-butanol in a water-containing solvent, adding an alkaline earth oxide or hydroxide, separating the alkaline earth L-tartrate and fractionally distilling the remaining layer to obtain d-2-amino-1-butanol.

6. The process of claim 5 in which the separation of the tartrate salt is conducted in water.

7. The process of claim 6 in which about a stoichiometric quantity of sulfuric acid and sufficient water to dissolve the L-tartaric acid is added to the alkaline earth L-tartrate, the calcium sulfate formed is separated out and free L-tartaric acid is recovered by evaporating off the water.

References Cited

UNITED STATES PATENTS 3,401,194  9/1968  Zoja _____ 260—584

OTHER REFERENCES

Radke et al.: JACS, vol. 76, pp. 2801–2 (1954).
Roggero et al.: Compt. Rend, vol. 253, pp. 2704–5 (1961).

LEON ZITVER, Primary Examiner

M. W. GLYNN, Assistant Examiner

U.S. Cl. X.R.

260—584